United States Patent [19]
Dahl

[11] 3,890,876

[45]* June 24, 1975

[54] TWO-PART, TWO-MATERIAL FASTENING ELEMENT

[76] Inventor: Norman C. Dahl, 40 Fern St., New York, N.Y. 02173

[ * ] Notice: The portion of the term of this patent subsequent to Sept. 11, 1990, has been disclaimed.

[22] Filed: June 18, 1973

[21] Appl. No.: 370,965

[52] U.S. Cl. ............................... 85/62; 10/27 R
[51] Int. Cl. ........................................... F16b 31/02
[58] Field of Search ............... 85/62, 61; 151/38; 10/27 R

[56] References Cited
UNITED STATES PATENTS
| | | | |
|---|---|---|---|
| 869,443 | 10/1907 | Lund | 85/61 |
| 3,757,630 | 9/1973 | Dahl | 85/62 |

FOREIGN PATENTS OR APPLICATIONS
| | | | |
|---|---|---|---|
| 774,574 | 5/1957 | United Kingdom | 85/62 |

*Primary Examiner*—Marion Parsons, Jr.
*Attorney, Agent, or Firm*—Richard P. Crowley

[57] ABSTRACT

Improved bolt force indicators and methods for work hardening of yielding bolt force indicators incorporating a yielding section designed so that its plastic deformation indicates the existence of a predetermined bolt force. The work hardening, done after manufacture and before use, greatly increases the sensitivity of the indicator to the predetermined force level. In the indicator device without work hardening, a specified amount of plastic deformation is needed to signal the existence of the predetermined bolt force, while in the work-hardened indicator, any plastic deformation is a signal that the predetermined force exists in the bolt.

13 Claims, 15 Drawing Figures

PATENTED JUN 24 1975  3,890,876

SHEET 1

3,890,876

TWO-PART, TWO-MATERIAL FASTENING ELEMENT

REFERENCE TO PRIOR APPLICATION

This application is a continuation-in-part of my application U.S. Ser. No. 223,259, filed Feb. 3, 1972, now U.S. Pat. 3,757,630.

BACKGROUND OF THE INVENTION

There exists a number of bolts, nuts and washers which incorporate yielding sections which deform plastically to indicate when a predetermined force is acting in the bolt (for example, see British Pat. Nos. 1,006,452 and 935,347. My U.S. Pat. Nos. 3,383,974 and 3,431,812 and U.S. Pat. application No. 223,259, filed on Feb. 3, 1972, now U.S. Pat. No. 3,757,630 all herein incorporated by reference, describe nuts and bolts having such yielding sections.

In such force-indicating devices, when the bolt (or nut) is tightened, the yielding section begins the predetermined force level. When the tightening is continued beyond the point of initial deformation, the yielding section requires an increasing bolt force to produce further plastic deformation. However, as the deformation proceeds, there is a continuing decrease in the increment of bolt force required to cause a fixed increment of plastic deformation of the yielding section; i.e., as the deformation continues, the force-deformation curve becomes "flatter." Most such force-indicating devices are designed such that the predetermined bolt force occurs in this "flatter" portion of the force-deformation curve, and the existence in the bolt of this predetermined force is indicated by some predetermined amount of deformation of the yielding section, an amount which corresponds to a force in the "flatter" portion of the force-deformation curve.

The utility and accuracy of this design procedure lies in the fact that a given percentage error in producing the predetermined amount of plastic deformation leads to a much smaller percentage error in achieving the predetermined bolt force because of the "flatness" of the force-deformation curve for the yielding section. However, there are two difficulties with this procedure. First, because of inevitable variations in material properties and in manufactured dimensions of the yielding section, there are going to be commensurate variations in the actual bolt force produced, even though the predetermined amount of deformation is produced with great accuracy. Second, the necessity to produce a specified amount of plastic deformation of the yielding section introduces substantial complications, and, therefore, cost, into the bolt-tightening operation as opposed to a situation where it is necessary only to produce some plastic deformation.

SUMMARY OF THE INVENTION

This invention is directed to improved yielding-fastener, indicator devices, and to a method of manufacturing and using such devices. In particular, this invention is directed towards producing yielding bolt force indicators which begin to yield at a force equal to or only slightly below the desired predetermined bolt force, and for which evidence of some plastic deformation of the yielding section is an indication that the predetermined force exists in the bolt. This improved performance is achieved by taking advantage of the work-hardening characteristics of the materials from which such force-indicating devices customarily are manufactured. More specifically, this performance is achieved after manufacture and before use by subjecting the indicating device to a force which is equal to or slightly below the desired predetermined bolt force or by producing in the yielding section a predetermined amount of permanent deformation which corresponds, on the average, to the deformation associated with the desired predetermined bolt force.

DESCRIPTION OF THE PREFERRED METHOD

Figure 1A:
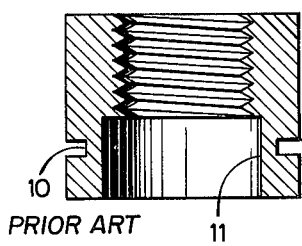
FIG. 1(a) is a sectional view of the nut of my U.S. Pat. No. 3,431,812.
Figure 1B:
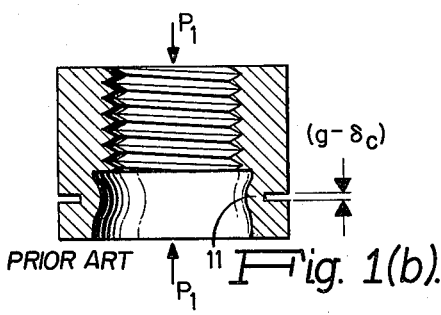
FIG. 1(b) is a sectional view of the nut of FIG. 1(a) after it has been compressed by a force $P_1$.

FIG. 1(a) shows a nut with an integral nonthreaded extension, on the external side of which there is formed an annular groove 10 of axial width g. The yielding section is the ring of material 11 at the bottom of the external annular groove. FIG. 1(b) shows that the yielding section 11 of FIG. 1(a) moves radially inwards when the nut is compressed by a force $P_1$, and that the external annular groove has an axial width $(g - \delta_c)$ when the force $P_1$ is acting.

Figure 2A:
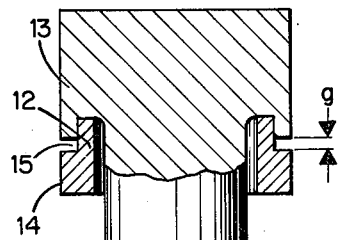
FIG. 2(a) is a sectional view of the bolt head of my U.S. patent application 223,259.
Figure 2B:
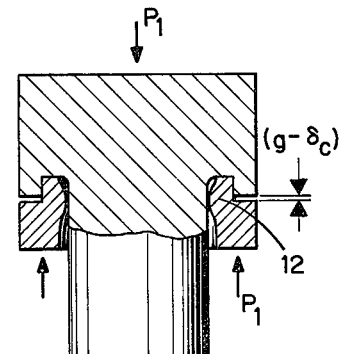
FIG. 2(b) is a sectional view of the bolt head of FIG. 2(a) after it has been compressed by a force $P_1$.

FIG. 2(a) shows a two-part bolt with an integrally formed head 13 and an axial extension 14 radially spaced from the bolt shank and abuttingly secured to the head 13 so as to form an external annular groove 15 of axial width g. The yielding section is the ring of material 12 at the bottom of the external annular groove. FIG. 2(b) shows that the yielding section 12 of FIG. 2(a) moves radially inwards when the bolt head is compressed by a force $P_1$, and that the external annular groove has an axial width ($g - \delta_c$) when the force $P_1$ is acting.

Figure 3:
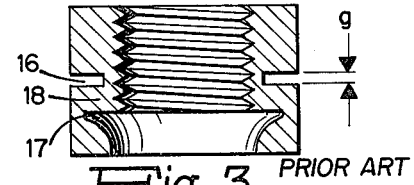
FIG. 3 is a sectional view of the nut of my U.S. Pat. No. 3,383,974.

FIG. 3 shows a nut with an internal annular groove 17 and an external annular groove 16 which radially overlaps the internal groove 17. The yielding section is the ring of material 18 in the region of overlap of the internal and external annular grooves. When the bolt force $P_1$ is carried by the nut, the yielding ring 18 deforms in shear, causing the external groove 16 to decrease in axial width.

Figure 4A:
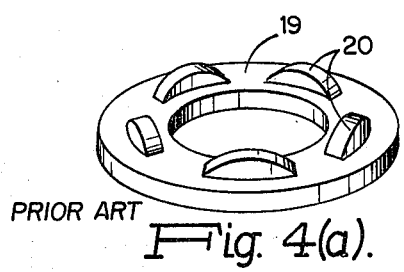
FIG. 4(a) is an isometric view of the washer of British Pat. No. 1,006,452.
Figure 4B:
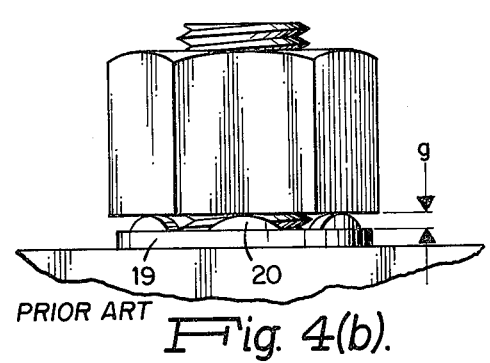
FIG. 4(b) is a view illustrating how the washer of FIG. 4(a) is used to indicate force in a bolt.

FIG. 4(a) shows a washer 19 with a yielding section consisting of several equally spaced protrusions 20 formed on one face of the washer. FIG. 4(b) shows how the washer is used to indicate bolt force with the protrusions producing a gap, originally of axial width g, between the top surface of the washer and the bottom surface of the nut. When the bolt force P is carried by the washer, the yielding section consisting of the protrusions 20 deforms plastically in compression, and the gap decreases in axial width.

Figure 5:
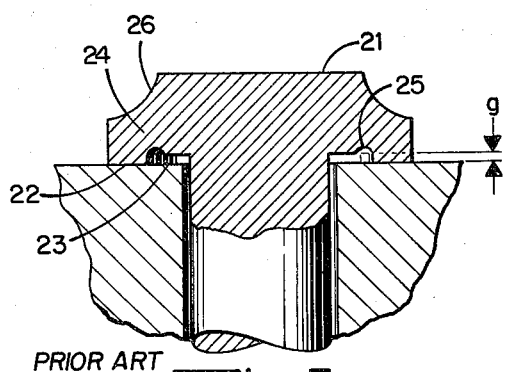
FIG. 5 is a sectional view of the bolt head of British Pat. No. 935,347.

FIG. 5 shows an integrally formed bolt head 21 which has several equally spaced feet 22 and an axially recessed area 23 of gap depth g surrounded by a groove 25. The yielding section is the material 24 in each foot between the inwardly concave surface 26 and the groove 25. When the bolt carries the force P, the sections 24 yield in combined bending and shear, and decrease the gap depth of the axially recessed area 23, this gap decrease being observable between the feet.

Figure 6:
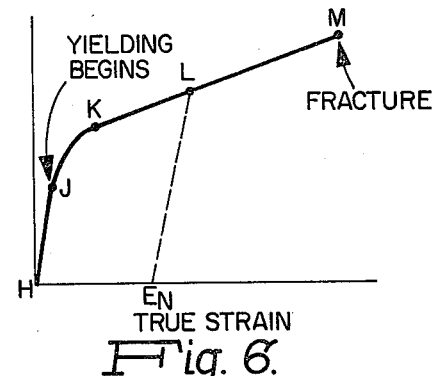
FIG. 6 depicts the stress-strain behavior typical of steels used for bolts and nuts.

FIG. 6 shows the tensile test stress-strain behavior typical of steels used for bolts and nuts. True stress is the load per unit of area of deformed material and true strain is obtained by summing up the increments of strain along the loading path, each increment of strain being obtained by dividing the increment of deformation by the then existing dimension of the element undergoing deformation. The deformation is completely elastic up to the point J where the yielding begins. When the stress is removed, the unloading path is along the line JH, and there is no resulting permanent strain when the stress has been reduced to zero. Beyond J, as the stress is increased, the material behavior follows the path JKLM until fracture occurs at point M, and the behavior along JKLM is a combination of elastic (recoverable) and plastic (permanent) deformation, with the plastic deformation becoming increasingly predominant as the stress is increased. The point K is representative of the point of maximum load in the tensile test, and along the path KLM, the area of the necked section of the tensile specimen decreases more rapidly than the load decreases, so that the true stress continues to increase until fracture occurs. This increase in stress required to produce additional plastic deformation is called "work hardening" of the steel.

Steel has the property that, if it has been work hardened by plastic deformation to a particular stress level and then is unloaded, it will behave in an elastic (linear) manner during the unloading process. Further, if the steel is subsequently reloaded, it will again behave elastically up to the previously work-hardened stress level, and beyond this, it once again deforms plastically. For example, if the tensile specimen is loaded to the point L in FIG. 6 and the stress then reduced to zero, the stress-strain path during unloading will be along the line LN parallel to JH, and the unloaded specimen will be left with a permanent strain $E_N$. Upon reloading the stress-strain path is elastic along the line NL until the point L is reached, at which point the deformation curve takes an abrupt change in direction, due to the onset of plastic deformation, to continue along the path LM.

Figure 7A:
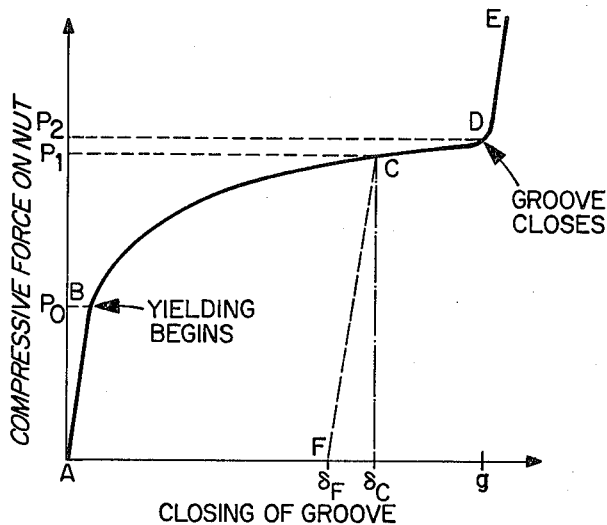
FIG. 7(a) depicts the compression behavior of the yielding section of either the bolt head of FIG. 2(a) or the nuts of FIGS. 1(a) and 3 when constructed of a material with the stress-strain behavior of FIG. 6.

When a material with the properties illustrated in FIG. 6 is used in the yielding section of the bolt force indicator of either FIG. 1(a) or FIG. 2(a), the general shape of the force-deformation behavior of the yielding section, when loaded as shown in FIG. 1(b) or FIG. 2(b), will be as depicted in FIG. 7(a). The yielding section behaves elastically until yielding begins at the force level $P_0$, after which the plastic deformation causes the force-deformation curve to become increasingly "flatter" until at point D where there is an abrupt change in the direction of the curve as a result of the closing of the external annular groove. If the compression test is halted at the point C when the compression force has the value $P_1$, and the force is then reduced to zero, the unloading path will be along the line CF and the axial width of the external groove will be reduced by the amount $\delta_F$. If after unloading to the point F, the bolt or nut were taken out of the machine and given to another person, who had no knowledge of the previous loading history, with the request that its force-deformation behavior be measured, that person would produce the curve shown in FIG. 7(b); that is, the person would find that the behavior was linear up to the force $P_1$, and that small increments of force beyond $P_1$ caused rather large deflections until at the force $P_2$, only slightly above the force $P_1$, the behavior suddenly became "stiff" again, behaving in the region DE essentially as it did in the linear region FC below the force level $P_1$. In short, the previous work hardening to the force level $P_1$ changed the behavior of the bolt force indicator to make it "soft" in the small range of bolt force between $P_1$ and $P_2$.

Figure 7B:
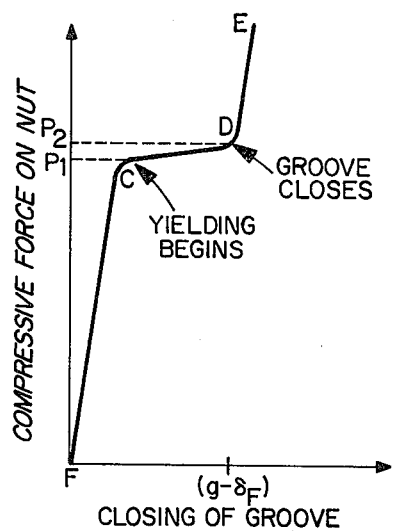
FIG. 7(b) depicts the compression behavior of a yielding section identical to that used for the test reported in FIG. 7(a), except that the section previously has been compressed by the force $P_1$, and the force $P_1$ then has been removed.
Figure 9A:
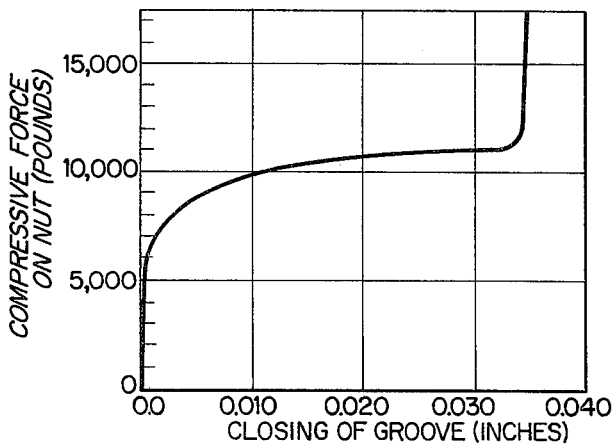
FIG. 9(a) shows the force-deformation data from a test such as illustrated in FIG. 2(b) in which the compressive force was increased until the external groove closed.
Figure 9B:
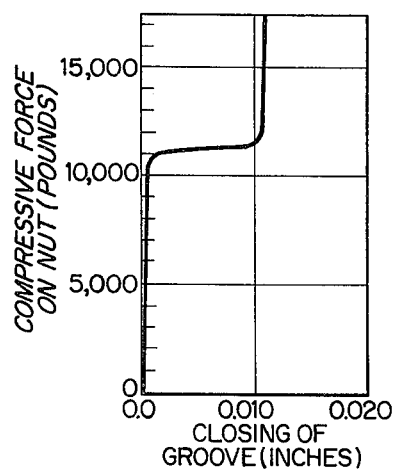
FIG. 9(b) shows the force-deformation data from a test of a specimen identical to the specimen of FIG. 9(a), except that the specimen previously had been compressed by a force of 10,800 lbs. and then unloaded.

In FIGS. 9(a) and 9(b) is presented experimental evidence confirming the behavior depicted in FIGS. 7(a) and 7(b). FIG. 9(a) shows the data from a two-part steel force indicator compressed in a testing machine as illustrated in FIG. 2(b). An identical indicator was work hardened by being loaded with a force of 10,800 lbs., which was then reduced to zero, and subsequently was compressed until the external groove closed, with the results shown in FIG. 9(b). It may be seen that the work hardening does produce in practice what previously has been claimed: namely the work hardening produces a sharp break in the force-deformation curve at the transition between the elastic and plastic regions of behavior, and thus modifies the bolt force indicator so that evidence of any (as opposed to a specified amount of) plastic deformation will be an indication that the predetermined force ($P_1$) exists in the bolt.

Although the foregoing discussion has been in relation to the bolt force indicators shown in FIGS. 1 and 2, the same behavior would be displayed by the indicators shown in FIGS. 3, 4 and 5 and by any other bolt force indicator incorporating a yielding section which deforms plastically to indicate when a predetermined force is acting in the bolt.

Figure 8A:
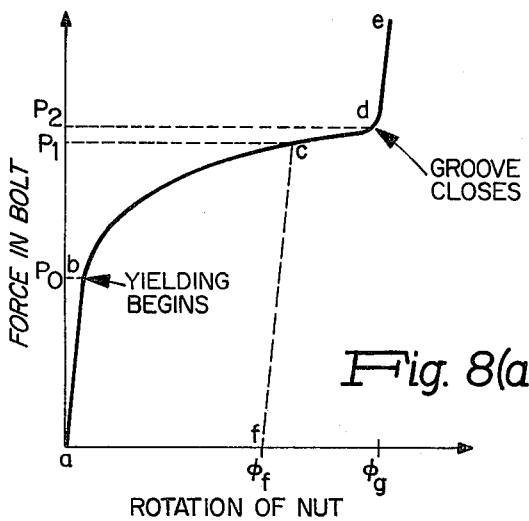
FIG. 8(a) depicts the bolt force-rotation behavior of the yielding section of either the bolt head of FIG. 2(a) or the nuts of FIGS. 1(a) and 3 when constructed of material with the stress-strain behavior of FIG. 6.
Figure 8B:
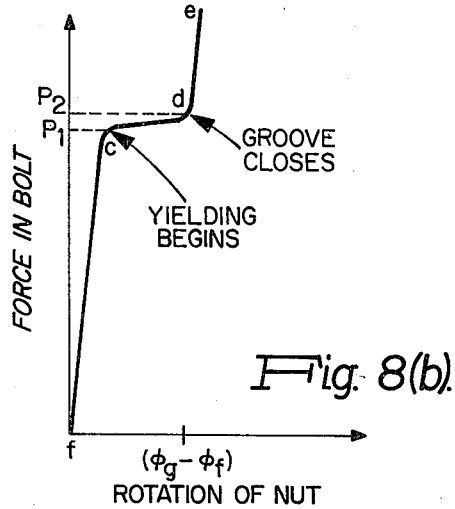
FIG. 8(b) depicts the bolt force-rotation behavior of a yielding section identical to that used for the test reported in FIG. 8(a), except that the bolt force previously has been raised to the level $P_1$, and then reduced to zero.

The same kind of behavior results when the force on the yielding section is produced by tightening the nut on the bolt, which is how the force is produced when a yielding bolt force indicator is used in practice. FIGS. 8(a) and 8(b) illustrate this behavior. Thus, if the nut is tightened until the bolt force is $P_1$ and then untightened, the relation between rotation of the nut and force in the bolt will be along the line cf in FIG. 8(a) as the nut is untightened, and when the bolt force is zero, the nut will be rotated through an angle $\phi_f$ from its original position (point a). When the force indicator subsequently is used again, the force-rotation behavior will be as shown in FIG. 9(b). When the force in the bolt is less than $P_1$, the relation between nut rotation and bolt force, and similarly between nut rotation and torque, will be essentially linear and "stiff" in the sense that each additional increment of nut rotation can be produced only by increasing the torque by an amount whose ratio to the existing torque is substantially the same as the ratio of the additional increment of rotation to the previous total rotation of the nut. When the bolt force $P_1$ is reached, the relation between nut rotation and torque abruptly becomes "soft" in the sense that substantial increments of nut rotation can be produced with very small incremental increases in torque. Finally, after rotation in this "soft" region cd, the force $P_2$ is reached and the rotation-torque relation abruptly becomes "stiff" again, resuming essentially the same incremental behavior (slope) it exhibited before the force $P_1$ was reached. In essence, by the preuse work hardening of the force indicator, its sensitivity to the force level $P_1$ has been tremendously increased.

From the foregoing, it is evident that work hardening of a yielding bolt indicator after manufacture and before use will substantially improve its performance in accurately indicating the presence in the bolt of a predetermined bolt force. When the force indicator is so treated, then any plastic deformation is an indication that the bolt carries the desired predetermined force to within a level of accuracy which can be specified beforehand. The method by which the plastic deformation is detected will vary with the particular indicator; for example, the force indicators shown in FIGS. 1, 2 and 3 can automatically indicate the occurrence of plastic deformation by extrusion of a flowable incompressible material (not shown) from the external annular groove when the groove decreases in axial width, or, for example, the use of an electrical wrench when the flowable material is conductive (see my U.S. Pat. No. 3,383,961, herein incorporated by reference). The plastic deformation of the force indicators of FIGS. 4 and 5 can be determined by use of a feeler thickness gage which detects changes in the gap whose original dimension is shown as g.

The preferred method of work hardening a bolt force indicator is to subject the yielding section to a compressive force which is equal to the desired predetermined bolt force. The most practical means of doing this would be to compress the indicator with an externally applied force as illustrated in FIGS. 1(b) and 2(b). The current state of the art in force measurement and in devices for exerting force will permit the economical application of the required compressive force with great accuracy; say to within ± 1 percent of the desired predetermined force level $P_1$. If a ± 1 percent accuracy is maintained in the preuse compression, then the indicator could be guaranteed to indicate the desired predetermined bolt force to with −1 percent on the low side. The accuracy which can be guaranteed on the high side would depend upon several factors, the most important of which would be the force level $P_2$ at which the groove or gap is designed to close, and the variations about the design level $P_2$ which occur in the manufactured indicators due to variations in the stress-strain properties of the material from which the yielding section is made, and variations in the manufactured dimensions. The cost of control of variations in material properties and manufactured dimensions rises very steeply with increasing control, and, therefore, the guaranteed accuracy on the high side will be primarily a question of what additional cost for close accuracy is acceptable in the marketplace. A most significant advantage of preuse work hardening is that it provides a very close guaranteed accuracy on the low side at very little additional cost.

In some applications, it may be necessary in tightening the bolt to close the groove or gap in the force indicator in order to provide protection against possible overloads. One example of such an application would be the bolts' holding a closure flange on a pressure vessel which accidentally could be subjected to an overpressure. In such applications, the force indicator would be designed so that the groove or gap closes at the desired predetermined force level; i.e., the force level $P_2$ in FIG. 7(a) will be the desired predetermined force level. As explained in the previous paragraph, the range of variation about the force level $P_2$ which actually occurs in the manufactured indicators will be a function of how closely the yielding section material properties and manufactured dimensions are controlled, and this in turn will depend on what additional price can be charged for this control. Under these conditions, the compressive force level to which the yielding section is work hardened; i.e., the force level $P_1$ in FIG. 7(a), will have to be sufficiently below the level $P_2$ to be outside the range of variations in $P_2$ obtained in the manufactured indicators.

An alternative method of preuse hardening would be to produce in the yielding section a predetermined amount of permanent deformation which corresponds to the average deformation associated with the desired predetermined bolt force level $P_1$. It would be a simple matter to design a machine which would produce a specified permanent amount of deformation while accomodating itself to variations in the force required to produce the deformation. To explain the basis for this procedure for work hardening, it is necessary to explain how variations in yielding section material properties and manufactured dimensions will alter the force-deformation curve in FIG. 7(a). First, it is likely that the axial width of the groove or gap, the dimension g in FIGS. 1 through 5, can be controlled closely with little cost. Thus, the primary effect of variations in material properties and dimensions will be to alter the bolt force required to produce a given permanent amount of closing of the groove or gap; i.e., the effect will be to shift the force-deformation curve of FIG. 7(a) up or down. If the curve of FIG. 7(a) were constructed from the data which represents the mean behavior of the manufactured indicators, then it may be seen that if there is produced in the yielding section of each indicator a permanent deformation of magnitude $\delta_F$, then on the average, the indicators will have been work hardened to the force level $P_1$, which is the desired predetermined bolt force level.

A variation of the foregoing method would be to work harden the yielding section by deforming it such that the groove or gap has a specified axial width after the deformation. For example, if the curve of FIG. 7(a) were constructed from the data which represents the mean behavior of the manufactured indicators, then it may be seen that if the yielding section of each indicator is permanently deformed such that the axial width of the groove or gap is $(g - \delta_F)$, then on the average, the indicators will have been work hardened to the force level $P_1$. This method may be the preferred method for work hardening of indicators designed so that the groove or gap closes at the desired predetermined bolt force level. A simple procedure for producing the axial width $(g - \delta_F)$ would be to insert a deformation-limiting means, such as a spacer, of thickness $(g - \delta_C)$ in the groove or gap, and then to compress the yielding section with a force sufficiently larger than $P_1$ to ensure that the desired permanent deformation of the yielding section takes place.

Where the indicator nut, bolt or washer is composed of multiple; i.e., two parts, or of a multiple part-multiple material; e.g., two-part, two-material construction (such as described in my copending application filed of even date herewith and incorporated by reference herein), the part and material employed which constitutes or incorporates the yielding section may be work hardened as described to obtain the benefits of my invention. My invention has been described for the purposes of illustration only with respect to certain prior art structural embodiments. However, my invention may be employed usefully in any force-indicating device which incorporates a yielding section to change the dimension of a gap or groove, and thus to indicate the application of a predetermined force.

Having described my invention, what I now claim is:

1. A fastener indicator device which comprises a yielding section therein subject to plastic deformation on application of a predetermined compressive force and characterized by a groove or gap therein, which device is further characterized by the yielding section composed of a material which has been work-hardened by the application of a loading force of the same character as that force to which the device is subject in use, such loading force slightly less than or equal to the said predetermined force, but greater than the force which would cause initial yielding of the material, whereby in use a change in the dimension of the groove or gap indicates that the fastener carries the predetermined force.

2. The device of claim 1 which includes an annular groove or gap which includes therein a flowable material, whereby the said predetermined force extrudes such material from such groove or gap as an indicator of such force level.

3. The device of claim 1 which is a bolt, the bolt comprising: a bolt head having a peripheral wrenching surface and a cylindrical extension terminating in a bearing face and having an inner surface, the inner surface of the cylindrical extension spaced apart from the outer surface of the bolt and defining therewith a radial clearance; and an annular groove formed on the outer wrenching surface of the cylindrical extension, said groove being less in axial width that twice the radial thickness between the bottom of the external groove and the inner surface of the cylindrical extension, thereby defining an annular section which plastically deforms radially inward with an essentially wedge-shaped cross section when said predetermined force acts on the bolt with resultant reduction of the axial width of the external groove.

4. The device of claim 1 which is a bolt, the bolt comprising:
   a. a first part which includes a bolt head integrally secured to said bolt, the bolt head having an outer wrenching surface, and includes a ring-like extension depending therefrom adjacent to said outer wrenching surface, and defining an axial extending inwardly directed surface;
   b. a second separate part having an outer wrenching surface, with one end thereof engaging said inwardly directed surface, and abuttingly secured to the extension of said bolt head and extending along said bolt, the other end thereof terminating in a bearing surface;
   c. said second part having an inner surface spaced apart from the outer surface of the bolt to define therewith a radial clearance; and
   d. an external radially directed annular groove defined by said outer wrenching surfaces, the external groove being less in axial width than twice the radial thickness between the bottom of the external groove and the inner surface thereby defining an annular section which plastically deforms radially inward with an essentially wedge-shaped cross section when said predetermined force acts on the bolt with resultant reduction of the axial width of the external groove.

5. A method of manufacturing a fastener indicator device, which indicator device incorporates a yielding section subject to plastic deformation by the application of a predetermined fastener force, and which device is characterized by a groove or gap therein which, by the application of the predetermined force and plastic deformation of the yielding section, changes in dimension, which method comprises:
   loading the device prior to the use thereof with a compressive loading force of the same character compressive as the force to which the device is to be subject to in use, such force equal to or slightly less than the said predetermined force to work-harden the yielding section, thereby enhancing the sensitivity of the device so that in use a change in the dimension of the groove or gap indicates that the fastener carries the predetermined force.

6. The method of claim 5 which includes loading the device to produce in the yielding section a predetermined amount of reduction in the width of the groove or gap, which amount of reduction corresponds to the average deformation associated with a loading force equal to or slightly less than said predetermined force.

7. The method of claim 5 which includes loading the device to reduce the axial width of the groove or gap to a specified width, which width corresponds to the average width of said groove or gap associated with a loading force slightly less than or equal to said predetermined force.

8. The method of claim 6 which includes inserting in the groove or gap prior to loading and reduction of the groove or gap a load deformation-limiting means, and then loading the device to provide a reduction of the width of the groove or gap.

9. The method of claim 8 wherein the deformation-limiting means is a spacer, and which method includes insertion of the spacer in the groove or gap prior to loading, and removing of the spacer after loading.

10. The method of claim 5 which includes loading the device after manufacture and before use of the device.

11. The method of claim 5 which includes detecting the loading force by gauge detection of the decrease in dimension of the gap or groove.

12. The method of claim 5 which includes applying a loading force to the device slightly less than or equal to the level of the range of variations in the force level of the manufactured material of the yielding section of the device.

13. The method of claim 5 which includes employing as a loading force on the device an exteranl compressive force.

\* \* \* \* \*

UNITED STATES PATENT OFFICE
CERTIFICATE OF CORRECTION

PATENT NO. : 3,890,876
DATED : June 24, 1975
INVENTOR(S) : Norman C. Dahl

It is certified that error appears in the above-identified patent and that said Letters Patent are hereby corrected as shown below:

In the title page, item "[76]", amend "40 Fern St., New York, N.Y. 02173" to read --40 Fern St., Lexington, Mass. 02173--.

In column 8, claim 5, line 44, amend "compressive as the force" to read --as that compressive force--.

In column 10, claim 13, line 7, amend "exteranl" to read --external--.

Signed and Sealed this sixteenth Day of September 1975

[SEAL]

Attest:

RUTH C. MASON
Attesting Officer

C. MARSHALL DANN
Commissioner of Patents and Trademarks